March 2, 1926.
J. B. MASERANG
RECEPTACLE
Filed August 17, 1925
1,574,837
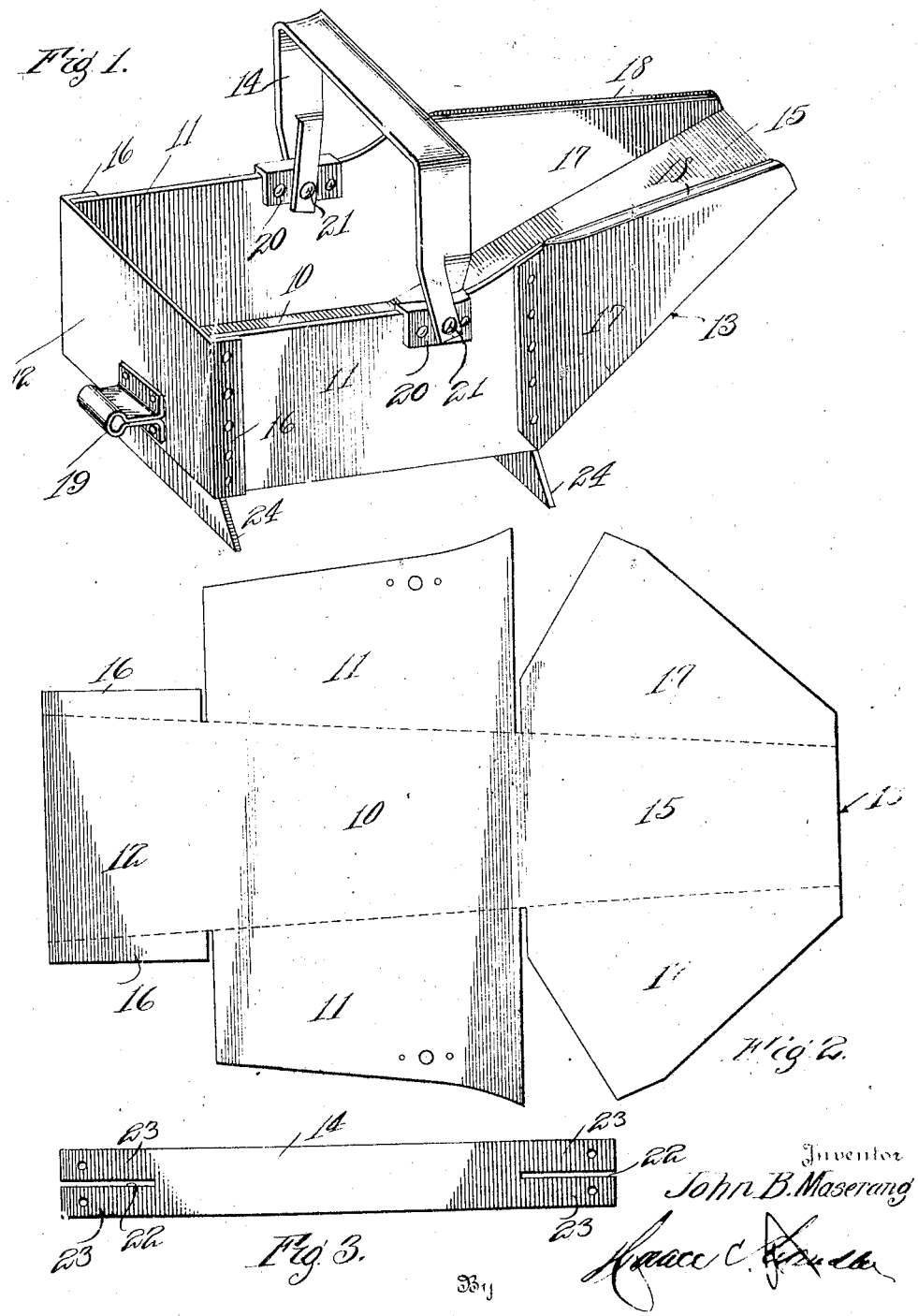

Patented Mar. 2, 1926.

1,574,837

UNITED STATES PATENT OFFICE.

JOHN B. MASERANG, OF BELLEVILLE, ILLINOIS.

RECEPTACLE.

Application filed August 17, 1925. Serial No. 50,744.

*To all whom it may concern:*

Be it known that I, JOHN B. MASERANG, a citizen of the United States, residing at Belleville, in the county of St. Clair, State of Illinois, have invented certain new and useful Improvements in Receptacles; and I do hereby declare the following to be a full, clear, and exact description of the invention, such as will enable others skilled in the art to which it appertains to make and use the same.

This invention relates to new and useful improvements in receptacles, and particularly to receptacles for containing wood and coal, although the device is adapted for use in connection with granular materials, or liquids.

One object of the invention is to provide a receptacle of this character which is simple in construction, and which can be formed from a single metal blank.

Another object is to provide a handle for the receptacle which is simple in construction, and which can be easily and simply pivoted on the sides of the receptacle.

Another object is to provide a receptacle which is adapted to be used as a scoop, the discharging or scooping end of which is formed to prevent too rapid flow of material therefrom.

Other objects and advantages will be apparent from the following description when taken in connection with the accompanying drawing.

In the drawing:

Figure 1 is a perspective view of a receptacle made in accordance with the present invention.

Figure 2 is a plan view of the blank from which the body of the receptacle is formed.

Figure 3 is a plan view of the blank from which the handle is formed.

Referring to the accompanying drawing, and particularly to Figure 1, the receptacle comprises a body having the bottom 10, the parallel sides 11, the rear end wall 12, the scoop portion 13, at the other end of the body, and the handle 14, which is pivotally connected to the sides 11.

As clearly seen in the plan view of the blank, the portion 10 represents the body of the blank, and forms the bottom 10, in the finished receptacle, while the portion 12 forms the rear wall of the receptacle, and 15 the bottom wall of the scoop portion 13. Formed on the opposite sides of the portion 10 are the wings 11 which form the sides of the receptacle. On opposite sides of the portion 12 are the flaps 16 which are adapted to be folded around the adjacent ends of the side walls 11, and riveted or otherwise secured thereto, while the portion 15 has the lateral wings 17 which form the sides of the scoop portion 13. The upper edge portions of these wings 17, which in their position as the sides of the scoop 13, are bent inwardly, as shown at 18, in Figure 1, whereby to prevent spilling of the material of the receptacle when such material is being poured therefrom. A suitable handle 19 is secured to the outer face of the rear end wall 12 of the receptacle, to assist in tilting the receptacle.

Folded over the upper edge portions of the side walls 11, intermediate the ends thereof, are the metal plates 20, said plates being properly riveted to the sides and being apertured, together with the said sides for receiving the pivots 21, of the handle 14. This handle is formed from a single length of metal, as seen in Figure 3, the opposite ends being longitudinally slitted, at 22, to provide the fingers 23. The pairs of fingers 23 are disposed in straddling relation to the reinforcing plates 20, and receiving therethrough the pivots 21, whereby said handle is properly attached to the receptacle, to permit swinging movement thereto, while being carried and tilted, as when dumping the contents. Furthermore, the straddling bifurcations of the handle serve to prevent the handle falling forwardly or rearwardly, to any great distance, with the result that said handle is always in a position to be easily grasped. The furcations have a wedging action on the plates 20, so that the pivotal movement of the handle is thereby limited. The transverse bight portion of the handle 14 has its edges curled upwardly to provide a rounded hand grip.

It will be noted that the bottom of the receptacle, and the bottom of the scoop portion are continuous, and taper from the rear end wall 12, to the outer end of said scoop portion, whereby to more properly permit material to enter the receptacle, when used as a scoop, and to better discharge the contents therefrom.

There is thus provided a simple, yet strong and durable receptacle for the purpose described, and one which can be manufactured at a comparatively low cost.

Secured to the lower face of the bottom 10 are the transversely extending angle plates, 24, the vertical portions of which form supports to elevate the receptacle above the floor.

As clearly seen in Figure 1 the rear edge portions of the sides or wings 17 overlap the forward edge portions of the side walls 11, and are riveted thereto.

What is claimed is:

A receptacle including vertical side walls, channel members secured in straddling relation to the upper edge portions of said walls, and a yoke shaped handle having its ends bifurcated and said bifurcations being disposed in straddling relation to said channel members and twisted whereby to aline their terminals with respect to a line transversely of the receptacle, and pivot members disposed through the walls, the channel members, and the furcations, whereby said bifurcations will have wedging action with the channel members to prevent the handle falling to any great distance in either direction.

In testimony whereof, I affix my signature.

JOHN B. MASERANG.